United States Patent [19]

Loepfe et al.

[11] 3,757,831

[45] Sept. 11, 1973

[54] EQUIPMENT FOR MONITORING THE SHUTTLE FLIGHT IN A LOOM

[75] Inventors: Erich Loepfe, Zollikerberg; Hans Peter Theiler, Wettswill Am Albis, both of Switzerland

[73] Assignee: Aktiengesellschaft Gebrueder Loepfe, Zurich, Switzerland

[22] Filed: May 18, 1972

[21] Appl. No.: 254,471

[30] Foreign Application Priority Data

May 18, 1971 Germany................... P 21 24 573.8

[52] U.S. Cl. .............................. 139/336, 139/341
[51] Int. Cl. ...................... D03d 51/02, D03d 51/44
[58] Field of Search..................... 139/341, 336, 1 R

[56] References Cited
UNITED STATES PATENTS

| | | | |
|---|---|---|---|
| 3,565,126 | 2/1971 | Schlappi ............................ | 139/341 |
| 3,613,742 | 10/1971 | Ainsworth et al. ................. | 139/336 |
| 3,181,573 | 5/1965 | Stutz.................................... | 139/341 |
| 3,326,246 | 6/1967 | Gurney............................... | 139/341 |
| 3,570,550 | 3/1971 | Budzyna............................. | 139/336 |

FOREIGN PATENTS OR APPLICATIONS 1,541,187 8/1968 France............................. 139/341

Primary Examiner—James Kee Chi
Attorney—Werner W. Kleeman

[57] ABSTRACT

An equipment for monitoring the shuttle flight in a conventional loom provided with a shuttle, particularly for measuring and indicating the regularity of such shuttle flight comprising: at least one pair of control coils mounted along the shuttle race and a permanent magnet mounted in the shuttle for generating a control pulse every time the permanent magnet passes over a control coil; a second permanent magnet coupled to the drive means of the loom and tracing a cyclic path per shuttle passage, and at least one further coil arranged near said path for generating a cycle pulse every time the second permanent magnet passes by the further coil; circuitry for measuring time intervals elapsing between two successive of said pulses; and a selector switching device for establishing various operational connections from any pair of said coils to the time measuring circuitry. The equipment allows for adjusting the loom picking mechanism in an optimal manner and is designed for practical use in weaving mills.

10 Claims, 6 Drawing Figures

EQUIPMENT FOR MONITORING THE SHUTTLE FLIGHT IN A LOOM

BACKGROUND OF THE INVENTION

The present invention relates to new and improved equipment for monitoring the speed and symmetry of the shuttle flight in a loom provided with a shuttle, a shuttle race member, two picking members, and drive means coupled to the picking members for picking the shuttle in passages of alternately opposite directions along the shuttle race member, and this invention also concerns the use of the inventive monitoring equipment in weaving mills for attaining optimal adjustment of the picking mechanism.

U.S. Pat. No. 2,586,335 discloses loom protection equipment surveying the shuttle flight in a loom and stopping the drive means thereof when the shuttle is travelling incorrectly, and in particular is too slow. This known equipment comprises two control switches arranged in parallel in the control circuit of the drive motor of the loom. The first and normally closed control switch is temporarily opened by means of a cam coupled with the drive motor, in a predetermined interval in every operation cycle of the loom. The second and normally opened control switch is actuated to be closed when the shuttle travel is correct, by means of a control pulse generating means in such a manner that the switch is closed during the predetermined opening interval of the first control switch so that the motor supply current is not interrupted at any time of the operation cycle. However, when the shuttle travels in an undesirable manner, the control circuit of the drive motor is opened temporarily so that the motor is stopped. Said control pulse generating means comprises a permanent magnet provided in the shuttle and two induction coils mounted apart along the longitudinal axis on the shuttle race, and further comprises an electronic circuitry connected operationally to said induction coils.

From U.S. Pat. No. 3,181,537 it is further known to survey the momentaneous speed of the shuttle at one or more places of the shuttle path, by means of an electromagnetic sensor functioning without physical contact with the shuttle, and to compare the actual momentaneous speed with a nominal value provided by an electronic time circuit independent on the operation cycle of the loom. This known surveying equipment actuates the stop mechanism of the loom when the actual momentaneous shuttle speed deviates from the desired nominal value.

In the above described known shuttle guards or protectors no means are provided for measuring the regularity of the shuttle speed over a sequence of two or more successive passages of the shuttle, nor do they comprise means for measuring and indicating the deviations of the shuttle travel time from a predetermined or desired value. The only purpose of the known shuttle guards or protectors is to stop the loom automatically as soon as the desired coincidence of two events, e.g., a shuttle control interval and a loom cyce interval, or a shuttle control interval and a predetermined time interval, is no longer existant.

SUMMARY OF THE INVENTION

Therefore, it is a primary object of the invention to provide a novel loom monitoring equipment suitable to measure the shuttle speed in both directions of the shuttle flight, and to measure and indicate the deviations of the shuttle travel time from a desired value.

It is another object of the invention to provide equipment for checking the operation of an electronic shuttle guard or protector which may be of conventional structure, and allowing for adjusting the loom so that the shuttle protector takes optimal response in both shuttle flight directions.

An objective and exact determination of the shuttle speed is important insofar as it enables one to adjust the picking mechanism of the loom in an optimal manner, i.e. such that the average shuttle speed for all operation cycles and in both shuttle flight directions will be equal. It is to be noted that an exact regularity of the shuttle speed in all operation cycles is an indispensable requirement for the manufacture of faultless and regular fabric. Moreover, an objective and exact determination of the shuttle sped allows for enhancing the efficiency of the loom by increasing the speed of the drive means and adjusting at the same time the picking mechanism in such a manner that the shuttle speed remains substantially unchanged, i.e. that it does not surmount an upper limit set by practical reasons. With that procedure, an extremly exact determination of the shuttle speed is of the utmost importance since normally the deviations of the shuttle speed generally increase with rising shuttle speed.

Said deviations are of substantial importance to the response or sensitivity of a shuttle guard or protector. Optimal adjustment of the shuttle protector is important for avoiding undesired cut-offs and idle periods of the loom, on the one hand, and for ensuring safe stopping in the so-called catastrophic event. That means that the loom must be stopped at the earliest possible time when the shuttle travels so slow that with beginning slay movement the shuttle might be gripped by the reed and pressed into the shed. It is evident that the shuttle protector should have the like sensitivity of response in either of the shuttle flight directions from left to right and vice versa. Adjusting the protector requires, however, that the deviations of the shuttle speed in one direction have substantially the same order of magnitde as the deviations in the other direction. Determination of said deviations requires an extraordinarily high exactness of the shuttle speed or travel time measurement.

Prior to the present invention the conventional procedure to adjust looms in weaving mills was based on the individual experience of the foreman weaver or other surveying person. This, however, is an individual method which cannot be expected to furnish absolutely exact results and which does not meet the demands required for the aforementioned objectives of the invention. After all, there exists a strict requirement for an objective mode of surveying loom operation which is suitable to be employed in weaving mills and easy to perform, and moreover supplies the desired exact measuring dates or readings.

In order to implement the aforementioned objectives and others which will become apparent in the present description, the monitoring equipment of this invention is generally manifested by the following features:

means comprising at least two control coils mounted along the shuttle race member, and a control element mounted in the shuttle, for generating a control pulse every time the control element passes over a control coil;

means comprising a cycle element coupled to the drive means for tracing a closed path per shuttle passage, and at least one cycle coil mounted in adjustable relationship along the closed path, for generating a cycle pulse every time the cycle element passes by a cycle coil;

circuitry having first and second inputs for measuring the time elapsing between two successive pulses fed to said first and second inputs, respectively;

a selector device comprising means for establishing operational connections from two of said control coils to said first and second inputs, or from one of said control coils and one cycle coil to said first and second inputs, respectively.

BRIEF DESCRIPTION OF DRAWING

The invention will appear more clearly from the following detailed description when taken in connection with the accompanying drawings, showing, by way of example, preferred embodiments of the invention.

In the drawings.

DETAILED DESCRIPTION OF THE PREFERRED EMBODIMENTS

Figure 1:
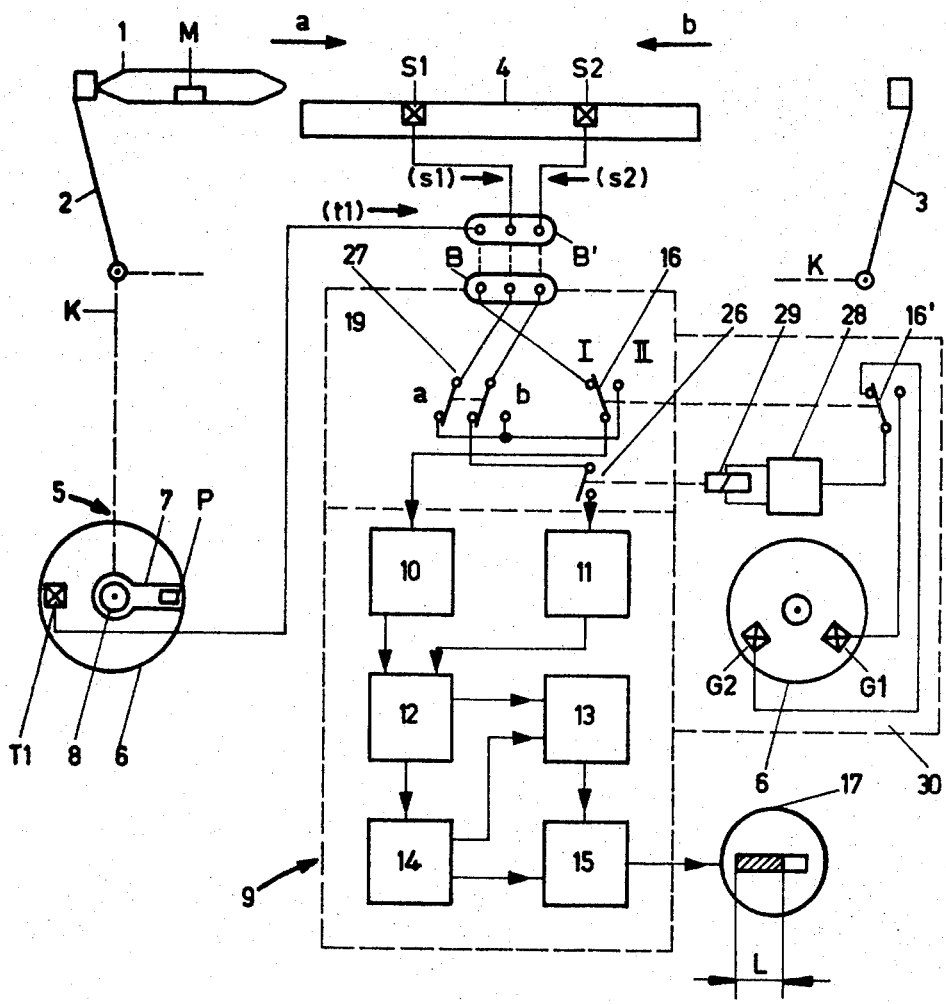
FIG. 1 shows a first embodiment of the inventive monitoring equipment in block diagram, and the therewith cooperating parts of a shuttle loom in diagrammatic view.

In FIG. 1 there are represented some parts of a loom which are essential for the cooperation with the inventive monitoring equipment. Those parts comprise a shuttle 1, a picking mechanism 2, 3, a shuttle race 4, a drive shaft 8 and mechanical connection members K—K coupling the picking mechanism 2, 3 to the drive shaft 8. The shuttle race 4 is mounted on the slay which is not shown, in a manner known in the art. The monitoring equipment comprises, as main parts, a cycle pulse generator 5 cooperating with the drive shaft 8, control means comprising a permanent magnet or other control element M mounted on the shuttle 1 and a pair of control coils or induction coils S1, S2 mounted in the shuttle race 4, an analog time measuring circuitry 9, an analog indicating device 17, and a trigger device 30 also cooperating with drive shaft 8.

The permanent magnet M is mounted in the body of the shuttle 1 and forms, together with the control coils S1, S2 countersunk in the shuttle race 4, a means for generating control pulses (s1), (s2) dependent upon the shuttle flight. Said means also are briefly denominated as control device in the following description. The flight directions of the shuttle on its passages from left to right and from right to left are indicated by arrows a and b, respectively.

The cycle pulse generator 5 comprises an arm 7 fixedly attached to drive shaft or crankshaft 8 of the loom, a permanent magnet or other cycle element P mounted near the free end of arm 7, a mounting disc 6 fixed on the loom in a stationary position and coaxially with drive shaft 8. Cycle pulse generator 5 further comprises a cycle coil or induction coil T1 supported by mounting disc 6 near the periphery thereof and mounted thereon adjustably with respect to its angular position. As indicated by the dotted lines K—K the picking mechanism 2, 3 is coupled to the drive shaft 8 by mechanical connection members in a manner known in the art. Normally, during any cycle or complete revolution of drive shaft 8 a weft or filling thread is inserted by shuttle 1, alternately in directions $a$ and $b$.

The sequence of all operations involved with one weft insertion of the loom is comprised by an operation cycle. Drive shaft 8 and permanent magnet P thus perform a full revolution per operation cycle, permanent magnet tracing a closed cyclic path therewith. Every time permanent magnet P passes over cycle coil T1 a cycle pulse ($t1$) is generated in the latter.

The time measuring circuitry 9 may form, together with indicating device 17 coupled to the output thereof, a portable structural unit. Alternatively, the indicating device 17 may be arranged as a separate unit. In this case, more than one indicating device may be provided to be selectively connected in series with time measuring circuitry 9. The latter comprises a selector device 19 and electronic measuring circuitry 10 – 15. Selector device 19 is provided with an input plug connector B to be connected over a detachable connection cable to a plug connection B' mounted on the loom. This arrangement allows for connecting time measuring circuitry 9 to cycle coil T1 of cycle pulse generator 5 and control coils S1, S2 in a quick and safe manner and without danger of interchanging the connections between said coils and circuitry 9 by mistake.

The electronic measuring circuitry of time measuring circuitry 9 comprises two input stages functioning as pulse shapers and amplifiers, namely a start input stage 11 and a stop input stage 10, further a time pulse circuit 12, e.g., a RS-flipflop, an integration stage 13, a reset stage 14 and a holding stage 15. The control pulse which is supplied to start input stage 11 defines the commencement of the time interval to be measured, and the pulse which is fed to the stop input stage 10 defines the end of that interval. The operation of the electronic measuring circuitry 10 – 15 will be described in detail in connection with FIG. 3.

The selector device 19 of the time measuring circuitry comprises switching devices 16, 16', 26 and 27. The change-over switch or function selector 16 allows for connecting, by manual setting, either cycle coil T1 of cycle pulse generator 5 or either of control coils S1, S2 to the stop input stage 10. The cycle selector 27 which may be operated manually allows for interchanging the connections leading from control coils S1 and S2 to input stages 10 and 11, respectively.

The trigger device 30 comprises two trigger coils G1, G2 mounted on mounting disc 6 of cycle pulse generator 5 at an angular distance from each other and adjustably with respect to their angular positions on disc 6. For clearness of the representation, disc 6 of the trigger device 30 is shown as a separate disc with respect to the cycle pulse generator 5; it is to be understood that separate discs may be provided or one and the same mounting disc may be used as support for coils T1, G1 and G2, as desired. Through trigger switch 16' which is coupled mechanically to function selector 16 it is possible to connect either of the trigger coils G1, G2 to a relay control circuit 28 the output of which is connected to a relay 29. A normally open gate switch 26 controlled by relay 29 is provided in the input line of start input circuit 11. Thus, when permanent magnet P passes over one of the trigger coils G1, G2, a trigger pulse is generated. One of these trigger pulses is fed through trigger switch 16' to control circuit 28 to operate relay 29 and close gate switch 26 during a predetermined time interval, e.g., of 50 milliseconds' duration.

Figure 2A:
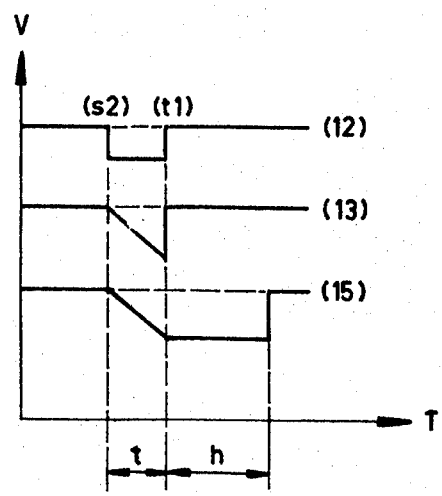
FIG. 2a is a diagram showing the output pulses produced by some of the circuits represented in FIG. 1 in block shape.
Figure 2B:
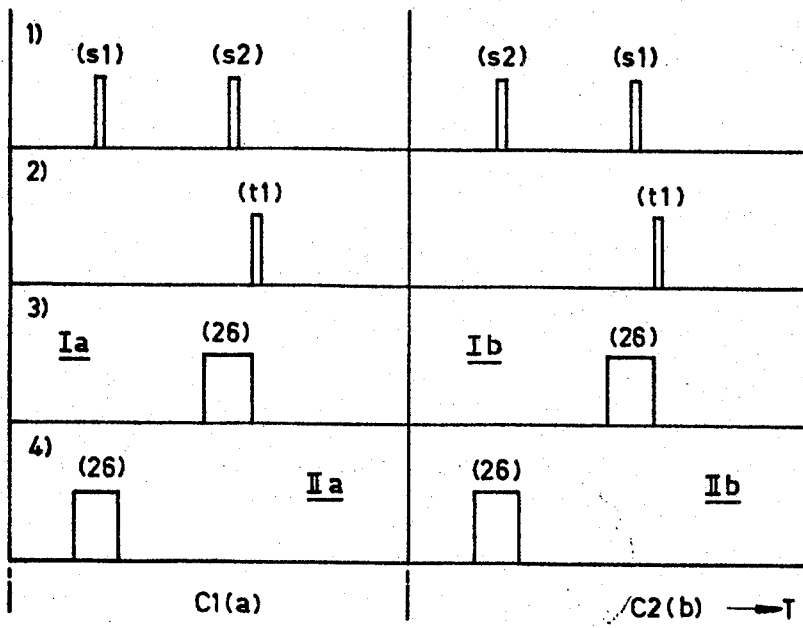
FIG. 2b shows the sequence of control pulses and cycle pulses occurring in two successive operation cycles, and the closing intervals of a gate switch operated in synchronism with the operation cycle of the loom.

With reference to FIG. 2b, the desirable sequence of the pulses (s1), (s2), (t1) generated by the coils S1, S2, T1 may be illustrated. In the upper two diagrams 1 and 2, the control pulses and cycle pulses, respectively, occurring in two successive operation cycles C1 and C2 having shuttle flight directions a and b are represented. Coil T1 of cycle pulse generator 5 is adjusted such that the cycle pulse (t1) generated when magnet P passes over coil T1, occurs normally only after magnet M of the shuttle has passed within an operation cycle the coils S1 and S2. The lower diagrams 3 and 4 show the closing intervals of gate switch 26 as rectangular pulses (26) in positions I and II of function selector 16 and trigger switch 16'. The angular positions of trigger coils G1, G2 are chosen in such a manner that gate switch 16 having position I passes, in operation cycle C1 having flight direction a, only control pulse (s2), and with position II only control pulse (s1), and vice versa in operation cycle C2 having flight direction b.

Selector device 19 allows, with the various possible positions of function selector 16 and cycle selector 27, for measuring the time intervals defined by the pulse pairs stated in the following Table 1.

TABLE 1

| Function Selector 16 position | Cycle Selector 27 position | Time interval start | end |
|---|---|---|---|
| I | a | (s2) | (t1) |
|  | b | (s1) | (t1) |
| II | a | (s2) | (s1) |
|  | b | (s1) | (s2) |

The operation of the electronic measuring circuitry 10 – 15 of the monitoring equipment shown in FIG. 1 will now be explained with reference to FIGS. 2a and 3, beginning with the positions of function selector 16 and cycle selector 27 as noted in Table 1 under Ia, that means coil T1 of cycle pulse generator 5 and coil S2 in the shuttle race being connected with the input stages 10 and 11, respectively, of time measuring circuitry 9. In this event, the time interval passing between a predetermined angular position of drive shaft 8 and the passage of shuttle magnet M over coil S2, with the working loom, or, in other words, the regularity of the shuttle flight relative to a predetermined angular position of arm 7 of cycle pulse generator 5 is controlled. FIG. 2a in which time T is plotted on the abscissa and potential V on the ordinate shows the output signals of circuits 12, 13, and 15, see FIGS. 1 and 3, as idealized pulses (12), (13), and (15), respectively in that case.

Figure 3:
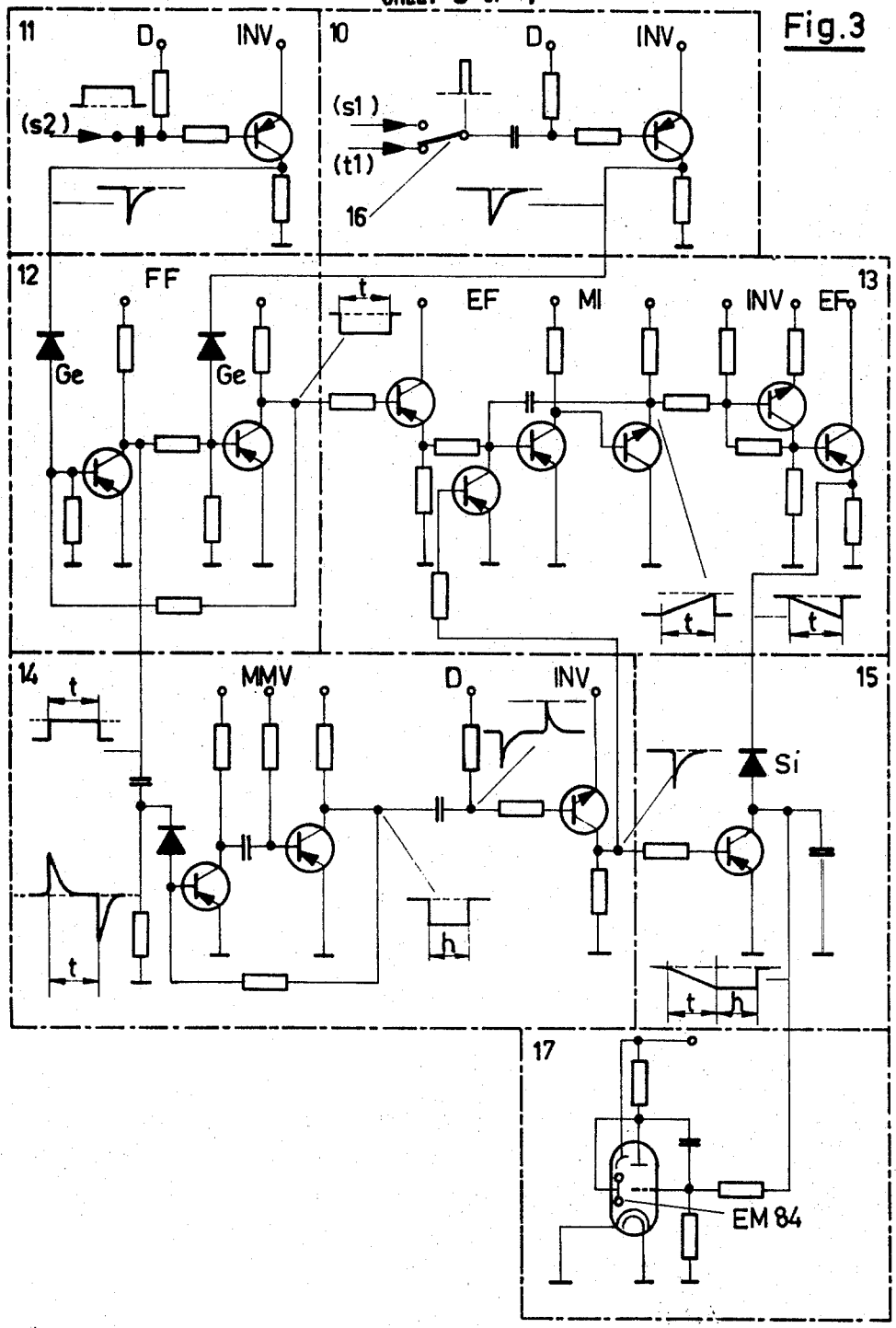
FIG. 3 is a detailed circuit diagram of the electronic circuitry of the equipment illustrated in FIG. 1.

In the detailed circuit diagram of FIG. 3, the electronic circuits of the time measuring circuitry 9 and indicating device 17, see FIG. 1, are illustrated. The functional units comprised by the block circuits 10 – 14 are labelled therein as follows: D = differentiating or peaking device; INV = inverter; FF = RS-flipflop; EF = emitter follower; MI = Miller integrator; MMV = monoflop or monostable multivibrator. In FIG. 3 the potential pulses occurring at the inputs and outputs of the various circuits are represented schematically, and the dotted horizontal lines at each pulse mark the zero potential. The resistors, capacitors, diodes, PNP-transistors and NPN-transistors are represented by their IEC symbols International Electrotechnical Committee standards symbols), so that a detailed description of such components may be dispensed with. Moreover, each germanium diode is labelled with the symbol Ge, and each silicon diode with the symbol Si.

In the indicating device 17, a tuning indicator tube of the type EM 84 (Philips) may be provided, by way of example.

The blocks shown in FIG. 3 are labelled with the same reference numbers as the corresponding blocks in FIG. 1.

During the measurement within an operation cycle C1 (flight direction a) of the loom the following operations are taking place. The control pulse (s2) and the cycle pulse (t1) which are supplied to the start input stage 11 and the stop input stage 10, respectively, are transformed in these stages into short negative pulses having steep leading edges. RS-flipflop 12 derives from those negative pulses a negative rectangular pulse (12), FIGS. 2a and 3, whose duration t equals the time interval between said short negative pulses. Integration stage 13 transforms the negative rectangular pulse (12) from RS-flipflop 12 into a positive going sawtooth pulse the amplitude of which corresponds to the duration t of said rectangular pulse, and inverts the positive going sawtooth pulse into a negative sawtooth pulse (13) which is fed to a first input of holding circuit 15. The input of reset stage 14 is connected to a second output of RS-flipflop 12 which delivers a positive going rectangular pulse of duration t the leading edge of which coincides with the leading edge of the transformed control pulse (s2) furnished from start input stage 11. The positive going rectangular pulse is differentiated in reset stage 14 and transferred to monoflop MMV which is triggered by the second negative peak of the differentiated rectangular pulse and generates a negative rectangular pulse of a predetermined duration h, e.g., 30 milliseconds. This negative rectangular pulse is differentiated in unit D of reset stage 14, and the differentiated pulse is inverted in unit INV of reset stage 14. The inverted pulse from stage 14 whose second negative peak defines the end of the 30 ms-interval is delivered to a second input of holding stage 15. By said negative peak, the output signal of holding stage 15 generated by the sawtooth pulse from integration stage 13 is reset to zero after expiration of the 30 ms-interval, so that a negative output signal (15) is produced having, as shown in FIG. 2a, a sloping linear leading edge of duration t, a roof portion of constant hight and duration h, and a steep trailing edge. The overall duration of output signal (15) is t + h, and its amplitude corresponds to the time interval defined by control pulse (s2) and cycle pulse (t1). The duration h may be selected such that the output signal (15) expires in the operation cycle C1 in which the time measurement is carried out.

Additionally, the output signal of reset stage 14 is delivered to a second input of integration stage 13 for resetting same exactly to zero after expiration of the 30 ms-interval.

The output stage (15) of holding stage 15 is transferred to analog indicating device 17 provided with a tuning indicator tube. The luminous area generated at the latter has a length L, FIG. 1, which corresponds to the amplitude of output signal (15) and thus to the time interval defined by the input pulses ($s2$) and ($t1$).

The operation of the electronic measuring circuitry 10 – 15 is similar as just described when the other pulse pairs stated in Table 1 are introduced in the input stages 10 and 11, in the place of the pulse pair ($s2$), ($t1$).

The tuning indicator tube in indicating device 17 may be sustituted by a pointer instrument of sufficient inertia for achieving an integration of the output signals of time measuring circuitry 9 over several successive operation cycles C1 or C2, if desired, i.e., for indicating a time average value of said output signals.

Figure 4:
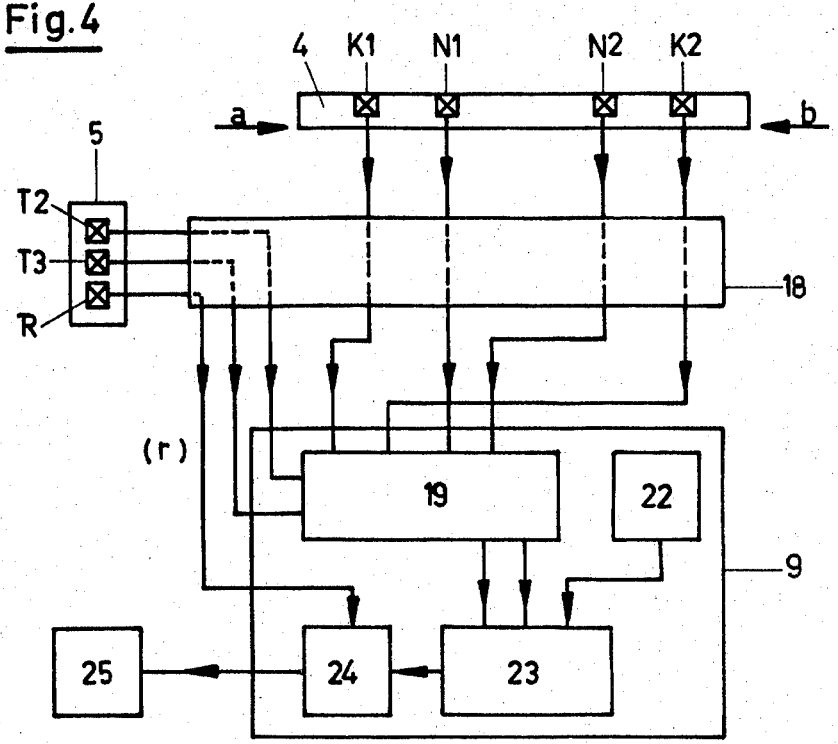
FIG. 4 shows another embodiment of the inventive monitoring equipment in block diagram representation.
Figure 5:
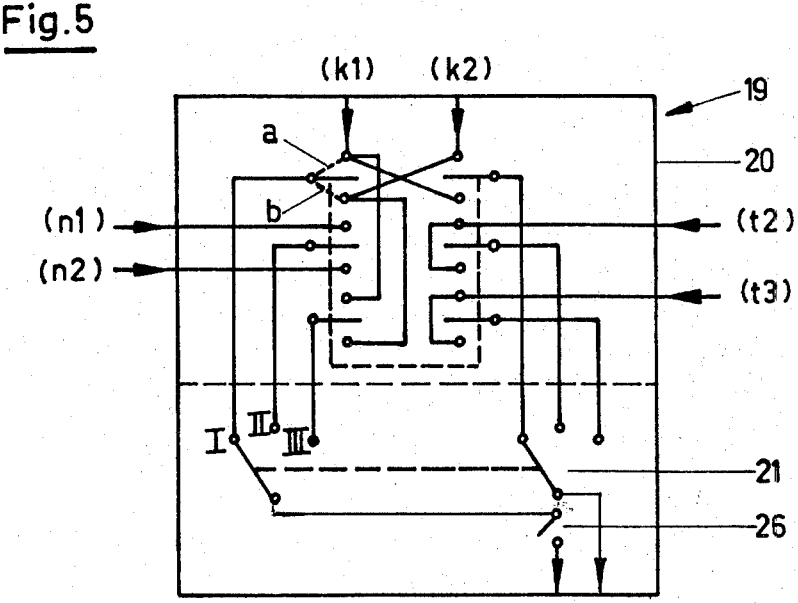
FIG. 5 is a detailed diagram of one of the circuits shown in block shape in FIG. 4.

FIGS. 4 and 5 illustrate an embodiment of the inventive monitoring equipment provided in addition to a conventional electronic shuttle guard or shuttle protector equipment comprising, among other elements which are not shown, a cycle pulse generator 5, two pairs of control coils or induction coils K1, K2 and N1, N2 mounted in the shuttle race 4, and a protector circuitry 18. The control coils comprise a pair of normal control coils N1, N2 and a pair of safety control coils K1, K2. For the sake of clearness, the parts of the loom and equipment already shown in FIG. 1 are omitted in FIG. 4, as well as the electrical and mechanical components of the shuttle protector equipment which serve for stopping the loom and which are known in the art. Thus, the shuttle 1 and shuttle magnet M as well as the picking mechanism 2, 3 and the drive shaft 8 are omitted in FIG. 4. Control coils N1, N2 generate so-called normal control pulses ($n1$), ($n2$) when shuttle magnet M passes over them, and so produce control coils K1, K2 safety control pulses ($k1,k2$) the purpose of which will still be described.

In the cycle pulse generator 5 of FIG. 4, the components 6, 7, 8 and P (FIG. 1) are not shown. These components are arranged in a similar manner as illustrated and described in connection with FIG. 1. However, in the embodiment of FIG. 4, three induction coils R, T2, T3 are provided on disc 6 in the place of a single induction coil T1 (FIG. 1). These induction coils comprise a reset coil R which produces a reset pulse ($r$) in the instant of the picking start, and two cycle coils T2, T3 for generating cycle pulses ($t2$), ($t3$).

The induction coils R, T1, T2 are mounted adjustably with respect to their angular positions on mounting disc 6.

The monitoring equipment shown in FIG. 4 differs from the one of FIG. 1 in that the time measuring circuitry 9 and the indicating device 25 operate digitally and allow for accomplishing a more extensive checking and monitoring programme.

The electronic shuttle protector circuitry 18 comprises pulse shaping circuits producing well defined control, reset and cycle pulses.

The time measuring circuitry 9 comprises a selector device 19 and electronic measuring circuitry including a count pulse generator 22, a gate circuit 23, and a counting circuit 24.

Selector device 19 which will be described in detail with reference to FIG. 5 has six inputs for receiving separately said cycle pulses ($t1$), ($t2$) and control pulses ($k1$, ($k2$), ($n1$), ($n2$) derived from the induction coils T2, T3, K1, K2, N1, N2 and shaped in protector circuitry 18, and has two outputs for delivering two selected ones of said pulses to gate circuit 23.

With reference to FIG. 4, the pulses selected in selector device 19 control gate circuit 23 having two control inputs and designed in such a manner that the first incoming pulse opens the gate circuit and the second incoming pulse closes same. In the opening interval of gate circuit 23, count pulses generated by count pulse generator 22 which are led to a third input of gate circuit 23 can pass the latter and reach one of the two inputs of counting circuit 24 which counts and stores the count pulses in a manner well known in the art.

Count pulse generator 22 may deliver count pulses at a repetition rate of, e.g., 1,000 kilocycles per second so that successive count pulses follow at intervals of 1 millisecond. At the end of each operation cycle of the loom counting circuit 24 is reset by a reset pulse ($r$) from reset coil R which is fed to a second or rest input of counting circuit 24. The design of such a counting circuit is well known in the art and thus need not be described in detail.

The output of counting circuit 24 is connected to a decimal count indicator 25 which may indicate up to three-figure decimal numbers so that the time intervals between successive cycle and control pulses may be read in decimal number representation.

FIG. 5 illustrates an embodiment of the selector device 19 of FIG. 4 which comprises a cycle selector 20, a function selector 21, and a gate switch 26.

A trigger device 30 as shown in FIG. 1 may be provided for operating gate switch 26. For clearness, said switch and selectors are represented as mechanical switching devices, however, for practical use an electronic circuitry will be preferred. According to FIG. 5, cycle selector 20 comprises six throw-over switches the contact arms of which are coupled mechanically, six inputs to which the control pulses ($k1$, ($k2$), ($n1$), ($n2$) and cycle pulse ($t2$), ($t3$) are connected, and two outputs as already mentioned. In the position shown in this Figure, cycle selector 20 is open or blocked so that no input pulse can pass to one of the outputs. In the upper position labelled $a$ of the contact arms the loom operation cycles having shuttle flight direction $a$, FIG. 4, are surveyed, and in the lower position $b$ only the cycles having shuttle flight direction $b$ are monitored.

Function selector 21 is a double three-way change-over switch having the positions I, II and III. Position I, by way of example, allows for measuring the time interval between safety control pulses ($k1$) and ($k2$).

Cycle selector 20 und function selector 21 may be set manually into the desired positions for measuring the various time intervals as shown in Table 2. Gate switch 26 is operated in a similar manner as described with reference to FIGS. 1 – 3.

TABLE 2

| Function selector 21 position | Cycle selector 20 position | Time interval start | end |
|---|---|---|---|
| I | a | (k1) | (k2) |
|   | b | (k2) | (k1) |
| II | a | (n2) | (t2) |
|   | b | (n1) | (t2) |
| III | a | (k2) | (t3) |
|   | b | (k1) | (t3) |

The two measurements feasible in position I of function selector 21 serve for monitoring the shuttle speed and symmetry of the shuttle flight with respect to directions $a$ and $b$. That means, it is possible to check whether the shuttle has a steady or constant average speed in either of the directions $a$ or $b$ between control coils K1 and K2, and further whether the average speeds in both directions are equal. If there is no such symmetry, the picking mechanism 2,3, FIG. 1, and its associated driving and coupling members should be adjusted in such a manner that the desired symmetry is achieved.

With function selector 21 in position II, the uniformity of the shuttle flight with respect to a predetermined angular position of drive shaft 8, FIG. 1, may be checked. Then, with cycle selector 20 in position $a$, normal control pulse ($n2$) is rendered effective. Suppose that coil T2 is adjusted such that cycle pulse ($t2$) occurs a predetermined short time interval, e.g., about 5 milliseconds, later than normal control pulse ($n1$). Monitoring throughout a number of successive operation cycles of flight direction $a$ will reveal uniformity or non-uniformity among picks in direction $a$, i.e., whether the measured time intervals are within fixed limits, e.g., between 4 and 6 milliseconds, or not.

When control coil N2 is rendered effective in the place of control coil N1, by means of cycle selector 20, the duration of the shuttle flight in the opposite direction $b$ can be measured. In the case that the measured time intervals are not restricted to the predetermined range from, e.g., 4 milliseconds to 6 milliseconds, the drive and coupling members of the picking mechanism, member 3, FIG. 1, should be adjusted in order to eliminate the deviations.

Such a correction, i.e., equalizing the time intervals and deviation ranges in both directions $a$ and $b$ of the shuttle flight is indispensable for the shuttle protector to have substantially equal response, that means that it responds to changes of the shuttle speed of equal magnitude.

Position III of function selector 21 allows for controlling the loom stopping operation in the so-called catastrophe case when inadmissable delay occurs in the last section of the shuttle path which might cause damage to the slay or other parts of the loom by shuttle throw. Such an event cannot be guarded against by the normal control coils N1, N2. In such a late instant, stopping the loom early enough to avoid the slay bumping against the shuttle is no longer possible. However, in this catastrophic event the shuttle protector disengages the positive drive mechanism of the slay and actuates the brake mechanism, so that the slay may strike the shuttle only by its inertia and the force of impact is substantially reduced. In this case the time measuring procedure takes place in analogous manner as with function selector 21 in position II, however, in position III the safety control coils K1 or K2 are effective in the place of the normal control coils N1 or N2.

While there is shown and described present preferred embodiments of the invention, it is to be distinctly understood that the invention is not limited thereto but may be otherwise variously embodied and practiced within the scope of the following claims.

What is claimed is:

1. An equipment for measuring and indicating the regularity of the shuttle flight in a loom provided with a shuttle, a shuttle race member, two picking members, and drive means coupled to the picking members for picking the shuttle in passages of alternately opposite directions along the shuttle race member, comprising:

means comprising at least a pair of associated control coils mounted along the shuttle race member, and a control element mounted in the shuttle for generating a pair of control pulses every time the control element passes by said pair of control coils;

means comprising a cycle element coupled to the drive means for tracing a closed path per shuttle passage, and at least one cycle coil mounted in adjustable relationship along the closed path for generating a cycle pulse every time the cycle element passes by each such cycle coil;

circuitry having first and second inputs for measuring the length of the time interval elapsing between any two of said pulses fed to said first and second inputs, respectively;

means operatively connected in series with said measuring circuitry for indicating said time interval; and a selector device comprising means for establishing operational connections from two of said control coils to said first and second inputs, or from one of said control coils and one cycle coil to said first and second inputs, respectively.

2. The equipment as defined in claim 1, wherein the selector device further comprises cycle selecting means for selecting from two of said control coils the one to be connected to the first input, or the one to be connected with the first input and the one to be connected with the second input of the time measuring circuitry.

3. The equipment as defined in claim 1, wherein the indicating means comprises a tuning indicator tube.

4. The equipment as defined in claim 1, wherein the time measuring circuitry and the indicating means form a portable structural unit.

5. The equipment as defined in claim 1, further comprising means for supressing the time measurement during the passages of the shuttle in either direction of the shuttle flight.

6. The equipment as defined in claim 5, wherein the suppressing means comprises a trigger device controled by the loom drive means, and a normally open gate switch connected in series with the first input of the time measuring circuitry and operated by the trigger device to be closed only after said control element having passed over one of the control coils.

7. The equipment as defined in claim 1, wherein the time measuring circuitry comprises a time pulse circuit having a start input and a stop input for producing an output pulse whose duration corresponds to the time interval between two successive input pulses fed to the start and stop inputs, respectively.

8. The equipment as defined in claim 7, wherein the time measuring circuitry comprises an integration stage connected in series with the output of the time pulse circuit for producing an output signal whose amplitude corresponds to the time interval between said two successive input pulses.

9. The equipment as defined in claim 8, wherein the time measuring circuitry comprises a holding stage connected in series with the output of the integration stage for holding the amplitude of the output signal thereof during a predetermined time interval.

10. The equipment as defined in claim 1, wherein the time measuring circuitry comprises a count pulse generator, a normally blocked gate circuit having a signal input connected in series with the count pulse generator, and first and second gate inputs, and a circuit operatively connected in series with the gate circuit for counting and registering count pulses passing through the gate circuit during an opening interval thereof.

* * * * *